(12) United States Patent
Nobes

(10) Patent No.: US 11,390,438 B2
(45) Date of Patent: Jul. 19, 2022

(54) HIGH BARRIER COATED PAPERBOARD

(71) Applicant: EVERGREEN PACKAGING, LLC, Memphis, TN (US)

(72) Inventor: Geofrrey Nobes, Collierville, TN (US)

(73) Assignee: Evergreen Packaging, LLC, Memphis, TN (US)

( * ) Notice: Subject to any disclaimer, the term of this patent is extended or adjusted under 35 U.S.C. 154(b) by 378 days.

(21) Appl. No.: 16/487,649

(22) PCT Filed: Feb. 21, 2018

(86) PCT No.: PCT/US2018/018952
§ 371 (c)(1),
(2) Date: Aug. 21, 2019

(87) PCT Pub. No.: WO2018/156579
PCT Pub. Date: Aug. 30, 2018

(65) Prior Publication Data
US 2020/0062474 A1    Feb. 27, 2020

Related U.S. Application Data

(60) Provisional application No. 62/461,286, filed on Feb. 21, 2017.

(51) Int. Cl.
| | | |
|---|---|---|
| *B65D 65/40* | (2006.01) | |
| *B32B 27/08* | (2006.01) | |
| *B32B 27/10* | (2006.01) | |
| *B32B 27/30* | (2006.01) | |
| *B32B 27/32* | (2006.01) | |
| *B32B 27/36* | (2006.01) | |
| *D21H 19/22* | (2006.01) | |
| *D21H 19/30* | (2006.01) | |
| *D21H 19/82* | (2006.01) | |
| *D21H 27/10* | (2006.01) | |

(52) U.S. Cl.
CPC .............. *B65D 65/40* (2013.01); *B32B 27/08* (2013.01); *B32B 27/10* (2013.01); *B32B 27/306* (2013.01); *B32B 27/32* (2013.01); *B32B 27/36* (2013.01); *D21H 19/22* (2013.01); *D21H 19/30* (2013.01); *D21H 19/82* (2013.01); *D21H 27/10* (2013.01); *B32B 2250/05* (2013.01); *B32B 2270/00* (2013.01); *B32B 2553/00* (2013.01)

(58) Field of Classification Search
CPC ......... B65D 65/40; B32B 27/08; B32B 27/10; B32B 27/306; B32B 27/32; B32B 27/36; B32B 2250/05; B32B 2270/00; B32B 2553/00; D21H 19/22; D21H 19/30; D21H 19/82; D21H 27/10
See application file for complete search history.

(56) References Cited

U.S. PATENT DOCUMENTS

2003/0180487 A1*  9/2003  Reighard ................ B32B 27/08
                                                          428/34.2
2007/0269622 A1*  11/2007  Chuprevich ............ B32B 27/10
                                                          428/34.2

* cited by examiner

*Primary Examiner* — Michael C Miggins
(74) *Attorney, Agent, or Firm* — Vedder Price P.C.

(57) ABSTRACT

Paperboard structures having extruded barrier layers are provided. Using layer multiplication extrusion it has been found that nylon barrier layer properties can be improved. The further inclusion of metallocene PE in the layers being layer multiplied through extrusion coating provide additional improvements in barrier properties for the paperboard substrate.

12 Claims, 1 Drawing Sheet

Table 1
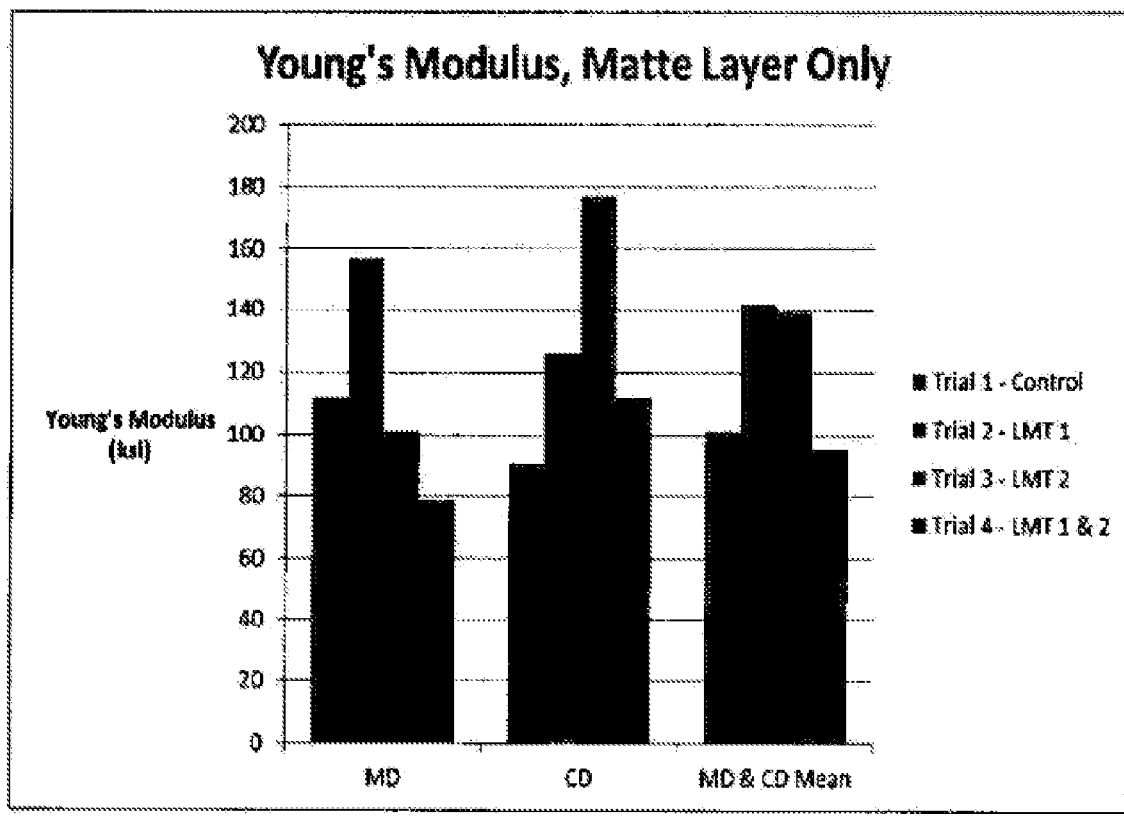

HIGH BARRIER COATED PAPERBOARD

RELATED APPLICATIONS

This application claims the benefit of U.S. Provisional Application Ser. 62/461,286 filed on Feb. 21, 2017 which is incorporated herein by reference.

FIELD OF THE INVENTION

This invention is directed towards the extruded paperboard layers in which layer multiplication technology (LMT) extrudes multiple coatings onto a paperboard substrate. Layer multiplication technology makes it possible to coextrude coatings of a designed thickness but with more layers than are achievable through standard coextrusion. LMT results in "flow stacking" in order to produce multiple micro-layers in an extruded layer.

BACKGROUND OF THE INVENTION

This invention relates generally to the extrusion of coating layers onto paperboard substrates to allow the paperboard substrate to have useful mechanical and chemical properties that can be used for packaging of foods, liquid packaging of food and non-food items, and similar uses for holding and dispensing a variety of consumer goods. Traditionally, extruded coatings are selected for an ability to contribute to an overall paperboard structure that may involve numerous variables including board stiffness, barrier properties with respect to water vapor transmission, oxygen barrier transmission, and the ability to minimize "scalping" or penetration of the package contents within the extruded barrier layers and/or paperboard.

U.S. Pat. No. 8,986,823, entitled, Microlayer Extrusion Coating and Laminating for Flexible Packaging and which is incorporated herein by reference, discloses an extrudate for use in extrusion lamination or extrusion coating having a microlayered structure. The structure has a microlayered core sandwiched between boundary layers and skin layers. The skin layer and boundary layer is LDPE The microlayered core contains at least one barrier polymer including EVOH, PVDC, nylon (polyamide), polyester, HDPE, LDPE, PP, PET, and combinations.

US Publication 2007/0269622A, incorporated herein by reference, discloses a microlayer low scalping barrier packaging material for food packaging comprising a core layer of paper or paperboard with polymeric coatings on both sides. The food contact side contains a barrier structure of a polyolefin layer, a tie layer, a polyamide layer, a tie layer and a polyolefin layer. The layers are applied to provide a weight ratio of materials in each series of 15:46 for each of the polyolefin layers, 5:46 for each of the tie layers and 6:46 for the polyamide layer. Metallocene LLDPE is mentioned as an option for the polyolefin layer and the structure can be provided using microlayers.

US Publication 2008/0038547A1, incorporated herein by reference, discloses a flat film barrier for packaging material having a core layer of paper or paperboard with polymeric coatings on both sides. The food contact side contains a barrier structure of a polyolefin layer, a tie layer, a polyamide layer, a tie layer and a polyolefin layer. The layers are applied to provide a weight ratio of materials in each series of 15:50 for the polyolefin layers, 5:50 for the tie layers and 10:50 for the polyamide layer. Metallocene LLDPE is mentioned as an option for the polyolefin layer and LMT may be used to apply one or more layers of the extruded structure.

US Publication 2015/0343748A1, incorporated herein by reference, discloses a multi-layered thermoplastic polymer film comprising a biopolymer. The multilayer film has at least 5 layers and having a total thickness from 10 microns to 100 microns. The film comprises: a first outer layer of polyolefin, a first tie layer, a core layer comprising of polylactic acid (the core layer is 5% to 30% of the total volume of the film), a second tie layer, a second outer layer of polyolefins; and wherein the first tie layer is disposed between the first outer layer and the core layer the second tie layer is disposed between the core layer and the second outer layer. Use of microlayer technology is described in the description as an option for generating the multilayer film.

US Publication 2014/0205847A, incorporated herein by reference, is directed to multilayer blown films with a core layer with at least one random polypropylene copolymer and at least one skin or intermediate layer adjacent to the core layer. The multilayer film has improved machine direction tear that is at least 30% higher compared to a core layer that has an impact polypropylene copolymer.

While there is an enormous variety of structures known in the art, there remains room for improvement and variation within the art to provide for barrier structures having enhanced functionality with respect to barrier layers and/or an ability to provide effective food and non-food paperboard packaging at a lower cost

SUMMARY OF THE INVENTION

It is one aspect of at least one of the present embodiments to provide layer multiplication (LM) in coextruded structures to provide enhanced barrier properties.

It is a further aspect of at least one embodiment of the present invention to provide for an extrusion barrier layer applied through a LM 20 process in which the barrier layer includes a metallocene polyolefin (mPE), or a blend of mPE with PE, applied along with a layer of at least one of a nylon layer or an EVOH layer.

It is a further aspect of at least one embodiment of the present invention to provide for a paperboard packaging substrate in which a board surface has a food contact surface comprising, in order: 6 #Nylon/2 #Tie/12 #LDPE/1.5 #Tie/2 #EVOH/1.5 #Tie/6 #LDPE.

Additionally, a portion of the extruded substrate can be bundled such that the bundled layers are applied using layer multiplication technologies. The bundled layer may include the Nylon/Tie/LDPE components and can result in a 4× layer multiplication extrusion pattern of 14 multiplied layers which are extruded in a proportional weight ratio and in a structure having a multiplied layer of: Nylon/Nylon/Tie/LDPE/Nylon/Tie/LDPE/Nylon/Tie/LDPE/Nylon/Tie/LDPE/LDPE.

It is a further aspect of at least one embodiment of the present invention to provide for a board substrate having a food contact surface comprising: 6 #Nylon/2 #Tie/6 #mPE blend (20% mPE+80% LDPE)/6 #LDPE/1.5 #Tie/2 #EVOH/1.5 #Tie/6 #LDPE.

Additionally, a portion of the extruded substrate can be bundled such that the bundled layers are applied using layer multiplication technology, The bundled layer may include the Nylon/Tie/mPE blend components and can result in a 4× layer multiplication extrusion pattern of 14 multiplied layers which are extruded in a proportional weight ratio and in a structure having a multiplied layer within the extruded substrate of: Nylon/Nylon/Tie/Blend/Nylon/Tie/Blend/Nylon/Tie/Blend/Nylon/Tie/Blend/Blend.

It is a further aspect of at least one embodiment of the present invention to provide for a board substrate having food contact surface of: 6 #Nylon/2 #Tie/12 #LDPE/1.5 #Tie/2 #EVOH/1.5 #Tie/6 #LDPE.

Additionally, a portion of the extruded substrate can be bundled such that the bundled layers are applied using layer multiplication technology. The bundled layer may include the LDPE/Tie/EVOH/Tie/LDPE components and can result in a 4× layer multiplication extrusion pattern of 14 multiplied layers which are extruded in a weight proportional ratio and in a structure having a multiplied layer within the extruded substrate of: LDPE/Tie/EVOH/Tie/Tie/EVOH/Tie/Tie/EVOH/Tie/Tie/EVOH/Tie/LDPE.

It is a further aspect of at least one embodiment of the present invention to provide for a board substrate having a food contact surface comprising: 6 #Nylon/2 #Tie/6 #mPE blend (20% mPE+80% LDPE)/6 #mPE blend/1.5 #Tie/2 #EVOH/1.5 #Tie/6 #mPE blend.

Additionally, a portion of the extruded substrate can be bundled such that the bundled layers are applied using layer multiplication technology. The bundled layer may include the mPE Blend/Tie/mPE Blend/Tie/EVOH/Tie/mPE blend components and can result in a 4× layer multiplication extrusion pattern of 14 multiplied layers which are extruded in a proportional weight ratio and in a structure having a multiplied layer within the extruded substrate of: mPE Blend/Tie/EVOH/Tie/Tie/EVOH/Tie/Tie/EVOH/Tie/Tie/EVOH/Tie/mPE blend.

It is a further aspect of at least one embodiment of the present invention to provide for a paperboard substrate for food packaging comprising or consisting of a paperboard having an outer surface and an inner surface, the outer surface defining a food contact surface; a multi-layer extrusion applied directly to the outer board surface and in the order of Nylon/Nylon/Tie/mPE Blend/Nylon/Tie/mPE Blend/Nylon/Tie/mPE Blend/Nylon/Tie/mPE Blend/mPE Blend; a tie layer applied to the blend layer; an EVOH layer applied to the tie layer; a tie layer applied to the EVOH layer; and a LDPE layer applied to the tie layer.

It is a further aspect of at least one embodiment of the present invention to provide for a paperboard substrate for food packaging consisting of and comprising a paperboard having an outer surface and an inner surface, the outer surface defining a food contact surface; a multi-layer extrusion applied directly to the board surface and having the structure of Nylon/Nylon/Tie/mPE Blend/Nylon/Tie/mPE Blend/Nylon/Tie/mPE Blend/Nylon/Tie/mPE Blend/mPE Blend; and additional extruded layers applied in order to the multi-layer extrusion of an LDPE layer/Tie layer/EVOH layer/Tie layer/LDPE.

It is a further aspect of at least one embodiment of the present invention to provide a paperboard substrate for food packaging consisting of and comprising a paperboard having an outer surface and an inner surface, the outer surface defining a food contact surface; a multi-layer extrusion applied directly to the board surface and having the structure of: Nylon/Nylon/Tie/mPE Blend/Nylon/Tie/mPE Blend/Nylon/Tie/mPE Blend/Nylon/Tie/mPE Blend/mPE Blend; and an additional extruded layer of LDPE applied to the multi-layer extrusion, The paperboard substrate may have a blend off nylon 6 and amorphous nylon. The nylon may be an amorphous nylon, or a MXD Nylon, or a blend of nylon 6 and amorphous nylon.

It is a further aspect of at least one embodiment of the present invention to provide a paperboard substrate consisting of or comprising a paperboard having an outer surface and an inner surface, the outer surface defining a food contact surface; a plurality of extruded polymer layers applied to the outer surface, the polymer layers further defining at least one barrier layer, the barrier layer being applied as a multi layer extrusion and selected from the group consisting of nylon 6, a blend of nylon 6 and amorphous nylon, amorphous nylon, MXD nylon, mPE, a blend of mPE and LDPE, a combination of nylon 6 and mPE, a combination of nylon 6 and a blend of mPE with LDPE, and combinations thereof.

It has been found that the use of LM significantly improves the modulus (stiffness) of layers that have been produced using the LM. The result of this increased stiffness creates a corresponding increase in rigidity of a paperboard carton. This in turn can result in structures having reduced bulge properties in paperboard cartons. Alternatively, the increase in stiffness may allow for less polymer resin to be applied to the paperboard substrate when the LM is used, reducing manufacturing costs of the paperboard cartons. Cartons made with the LM may use reduced amounts of polymer resin and still achieve similar performance to existing paperboard cartons. LM is also believed to increase the number of barrier layers to yield a more tortuous path for gas and moisture molecules and results in a better barrier.

These and other features, aspects, and advantages of the present invention will become better understood with reference to the following description and appended claims.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention; which broader aspects are embodied in the exemplary constructions.

Extruded paperboard samples were prepared using a pilot scale coextrusion line containing 3 extruders (2.5", 2" and 1.25" diameter) connected via a coextrusion feedblock to an adjustable slot die. Standard temperature profiles and resins were used to produce the samples.

It all examples set forth herein, where the bundle of extrusion components for which layer multiplication is used and which may result in adjacent identical layers such as two tie layers or two nylon layers with no intervening layers, a physical examination of the resulting structure may not show a demarcation between the layers. However, one of ordinary skill in the art, knowing the starting pound proportions and the selector pins used would be able to tell from the thickness of the layers that the extruded layer was formed in two parts. For the purposes of clarity, the resulting bundled layers will be set forth as separate layers to the extruded profile.

In Examples 1-5, the use of "Nylon" refers to Nylon 6. The "#" indicates "pounds" and is given in reference to lbs per 3,000 square feet of board surface.

The polyamides believed to be useful in the invention are Nylon 6, Nylon6-6, Nylon 6-10, amorphous nylon, MXD6 nylon, or the like. Nylon 6 is a preferred component of certain embodiments. The polyolefin may include low density polyethylene, high density polyethylene, metallocene polyethylene, linear low density polyethylene, polypropylene, or metallocene polypropylene.

Example 1

Sample 1 (Control)
Matte side: 6 #Nylon/2 #Tie/12 #LDPE/1.5 #Tie/2 #EVOH/1.5 #Tie/6 #LDPE
Gloss side: 12 #LDPE
Sample 2 (LM on nylon/Tie layer)
Matte side: 6 #Nylon/2 #Tie/12 #LDPE/1.5 #Tie/2 #EVOH/1.5 #Tie/6 #LDPE
Gloss side: 12 #LDPE
The bundled layer may include the LDPE/Tie/nylon/Tie/LDPE components and results in a 4× layer multiplication extrusion pattern of 14 multiplied layers which are extruded in a weight proportional ratio and in a structure having a multiplied layer within the extruded substrate of: LDPE/Tie/nylon/Tie/Tie/nylon/Tie/Tie/nylonrrie/Tie/nylonlTie/LDPE
Sample 3 (LMT on Tie/EVOH/Tie layer)
Matte side: 6 #Nylon/2 #Tie/12 #LDPE/1.5 #Tie/2 #EVOH/1.5 #Tie/6 #LDPE
Gloss side: 12 #LDPE
The bundled layer may include the LDPE/Tie/EVOH/Tie/LDPE components and results in a 4× layer multiplication extrusion pattern of 14 multiplied layers which are extruded in a weight proportional ratio and in a structure having a multiplied layer of: LDPE/Tie/EVOH/Tie/Tie/EVOH/Tie/Tie/EVOH/Tie/Tie/EVOH/Tie/LDPE
Sample 4 (LMT on nylon/Tie layer and Tie/EVOH/Tie layer)
Matte side: 6 #Nylon/2 #Tie/12 #LDPE/1.5 #Tie/2 #EVOH/1.5#-Tie/6 #LDPE Gloss side: 12 #LDPE
The resulting 28 layer extruded structure on the matte side is: nylon/nylon/Tie/LDPE/nylon/Tie/LDPE/nylon/Tie/LDPE/nylon/Tie/LDPE/LDPE/LDPE/Tie/EVOH/Tie/Tie/EVOH/Tie/Tie/EVOH/Tie/LDPE The effect of using multiplied layers can be seen microscopically with each layer being discrete and well defined. A cross section of extrusion coated paperboard from Sample 2 (LM on the nylon/tie layer) reveals stacked layers of nylon clearly visible (not illustrated).
FIG. 1 shows the Young's Modulus test results of testing sample strips of extrusion coated paperboard where the LM has been used in separate layers. The strips were tested in the machine direction (MD) and in the cross direction (CD). Sample 1 shows results from control conditions where the LM was not used. Sample 2 used the LM for the nylon-containing layer, Sample 3 used the LM for the EVOH layer, and Sample 4 used the LM for both the nylon- and EVOH-containing layers.

The modulus of the matte layers was measured, and the results are shown in FIG. 1. The data shows that when the LM is applied to the nylon layer the MD and CD module both increases by 40%. When the LM is applied to the EVOH layer there is no effect on the MD modulus while the CD modulus increases by 96%. However when both the nylon and EVOH layers are multiplied there is no net overall improvement in modulus.

Effects of using the LM is also seen in the barrier properties of the resulting coated paperboard. The oxygen transmission rate (OTR), when the nylon-containing layer is produced with LM, providing a 20% improvement in OTR. The measured OTR for Sample 1 (control) was 0.93 cc/m$^2$·day and the measured OTR for Sample 2 (LM on nylon layer) was 0.74 cc/m$^2$·day. No effect was seen on OTR from the EVOH layer when applied with LM.

When water vapor transmission rate (WVTR) is measured, neither the nylon layer alone nor the EVOH layer alone shows an effect on WVTR. However, when both layers are made with the LM, an unexpected additive effect is seen where the WVTR drops by 21%. The measured WVTR for Sample 1 (control) was 1.49 g/m$^2$·day and the measured WVTR for Sample 4 (LMT on both nylon and EVOH layers) was 1.17 g/m$^2$·day.

LM makes it possible to coextrude coatings of standard overall thickness but with more layers than are achievable through standard coextrusion. LM essentially results in "flow stacking" in order to produce microlayer structure. Use of LMT in coextruded products is believed to provide enhanced barrier properties due to the increase in the number of barrier layers which results in an even more tortuous path for gas and moisture molecules.

However, it has been surprisingly found that the use of LM in combination with metallocene-catalyzed LLDPE (mPE) significantly improves the oxygen and water vapor barrier properties of coextrusion coated paperboard. This synergistic effect is more pronounced than when LM is used with standard LDPE or when mPE is used without LMT. In other words, mPE applied with LM shows improvements that are better than the use of LDPE with LM or mPE without LM.

Extruded paperboard samples were prepared using a pilot scale coextrusion line consisting of 3 extruders (2.5", 2" and 1.25" diameter) connected via a coextrusion feedblock to an adjustable slot die. Standard temperature profiles and resins were used to produce the samples. A 4× LM was used for the preparation of all samples except for the control.

Example 2

Sample 1 (Control)
Matte side: 6 #Nylon/2 #Tie/12 #LDPE/1.5 #Tie/2 #EVOH/1.5 #Tie/6 #LDPE
Gloss side: 12 #LDPE
Sample 2 (LM on bundle of Nylon, Tie, & LDPE)
Matte side: 6 #Nylon/2 #Tie/12 #LDPE/1.5 #Tie/2 #EVOH/1.5 #Tie/6 #LDPE
Gloss side: 12 #LDPE
The bundled layer includes the Nylon/Tie/LDPE components and results in a 4× layer multiplication extrusion pattern of 14 multiplied layers which are extruded in a proportional weight ratio and in a structure having a multiplied layer within the matte side extrusion of: Nylon/Nylon/Tie/LDPE/Nylon/Tie/LDPE/Nylon/Tie/LDPE/Nylon/Tie/LDPE/LDP E.
Sample 3 (LM on nylon bundle of Nylon, Tie, and mPE)
Matte side: 6 #Nylon/2 #Tie/6 #mPE blend (20% mPE+80% LDPE)/6 #LDPE)/1.5 #Tie/2 #EVOH/1.5 #Tie/6 #
Gloss side: 12 #LDPE
The bundled layer may include the Nylon/Tie/mPE blend components and can result in a 4× layer multiplication extrusion pattern of 14 multiplied layers which are extruded in a proportional weight ratio and in a structure having a multiplied layer within the matte side extrusion of: Nylon/Nylon/Tie/Blend/Nylon/Tie/Blend/Nylon/Tie/Blend/Nylon/Tie/Blend/Blend.

Sample 4 (LM on EVOH bundle of LDPE, Tie, EVOH, Tie, & LDPE)
Matte side: 6 #Nylon/2 #Tie/12 #LDPE/1.5 #Tie/2 #EVOH/1.5 #Tie/6 #LDPE
Gloss side: 12 #LDPE
The bundled layer may include the LDPE/Tie/EVOH/Tie/LDPE components and results in a 4× layer multiplication extrusion pattern of 14 multiplied layers which are extruded in a weight proportional ratio and in a structure having a multiplied layer within the matte side extrusion of: LDPE/Tie/EVOH/Tie/Tie/EVOH/Tie/Tie/EVOH/TiefTie/EVOH/Tie/LDPE Sample 5 (LM on EVOH bundle with mPE blend, Tie, mPE blend, Tie, EVOH, Tie & mPE blend)
Matte side: 6 #Nylon/2 #Tie/6 #LDPE/6 #mPE blend (20% mPE+80% LDPE)/1.5 #Tie/2 #EVOH/1.5 #Tie/6 #mPE blend
Gloss side: 12 #LDPE
The bundled layer may include the mPE Blend/Tie/mPE Blend/Tie/EVOH/Tie/mPE blend components and can result in a 4× layer multiplication extrusion pattern of 14 multiplied layers which are extruded in a proportional weight ratio and in a structure having a multiplied layer within the matte side extrusion of: mPEblend/Tie/EVOH/Tie/Tie/EVOH/Tie/Tie/EVOH/Tie/Tie/EVOH/Tie/mPE blend.

TABLE 2

OTR results (tested at 23° C. and 50% RH) for Example 2

| Sample | LM Layers | OTR (cc/m² · day) |
|---|---|---|
| 1 | None (control) | 0.93 |
| 2 | Nylon/Tie/LDPE | 0.74 |
| 3 | Nylon/Tie/mPE blend | 0.41 |
| 4 | LDPE/Tie/EVOH/Tie/LDPE | 1.01 |
| 5 | mPE blend/Tie/mPE blend/Tie/EVOH/Tie/mPE blend | 0.40 |

Table 2 shows the results for oxygen transmission rate (OTR) for the Example 2 samples. Samples 3 and 5, which incorporate mPE, show the lowest OTR values as well as the tightest ranges (range data not shown). Samples 2 and 3 are identical in their formulation and preparation except that Sample 3 incorporates mPE in the portion of the matte side coating that is subjected to LM. Similarly, Samples 4 and 5 are identical except that Sample incorporates mPE in the in the portion of the matte side coating that is subjected to the LM. The data establishes that incorporating mPE in the bundled portion of the coating that is multiplied has a significant effect beyond just the LM itself. When the LM is used on the nylon bundle (Sample 2) a 20% reduction in OTR is observed. When mPE is incorporated in the nylon bundle with the LMT (Sample 3), a 45% reduction is achieved compared to the sample without mPE (Sample 2). Sample 3 has a 55% reduction in OTR compared to the control (Sample 1).

No effect on OTR is seen when the EVOH bundle (Sample 4) is split using the LM. The OTR value for Sample 4 is higher than that for the control (Sample 1) but is within the acceptable error associated with the method. However when mPE is included in the EVOH bundle being split (Sample 5) a 57% reduction in OTR is seen compared to the control (Sample 1).

TABLE 3

WVTR results (tested at 37.8° C. and 50% RH)

| Sample | LMT Layers | WVTR (g/m² · day) |
|---|---|---|
| 1 | None (control) | 1.50 |
| 2 | Nylon/Tie/LDPE | 1.44 |
| 3 | Nylon/Tie/mPE blend | 0.90 |
| 4 | LDPE/Tie/EVOH/Tie/LDPE | 1.52 |
| 5 | mPE blend/Tie/mPE blend/Tie/EVOH/Tie/mPE blend | 0.93 |

Table 3 shows the data for water vapor transmission rate (WVTR) for Example 2, Samples 1-5. The WVTR data shows a similar effect as was seen for OTR. A clear improvement in WVTR is seen when mPE is incorporated into the bundle where the LM is used. Using LM with the nylon bundle (Sample 2) does not show a significant reduction of WVTR.

However, when mPE is included in the nylon bundle with the LMT (Sample 3), a 40% reduction is achieved compared to the control (Sample 1). Similarly there is not a significant effect on WVTR for applying the LM alone to the EVOH bundle (Sample 4). However, when mPE is included in the EVOH bundle with the LM (Sample 5), a 38% reduction is achieved compared to the control (Sample 1).

TABLE 4

| Selector Pin | 2X | 4X |
|---|---|---|
| AACBB | AACBACBB | AACBACBACBACBB |
| ACBCA | ACBCCBCA | ACBCCBCCBCCBCA |

For the nylon bundle A=nylon, B=LDPE or mPE/LDPE and C=Tie

For the EVOH bundle A=LDPE or mPE/LDPE, B=EVOH, and C=Tie

As best seen in Table 4, the layer multiplication technology can be provided in which desired layers are proportionally extruded as a series of repeating structures. The selector pins of an extruder can be set in various combinations to yield a desired multiplied extrusion pattern for subcomponents within the traditional board extrusion layers.

The nylon bundle for Samples 2 and 3 are directed to layer multiplication of the Nylon/Tie/LDPE or a nylon/Tie/mPE blend to generate the bundle pattern as set forth under the Column heading 4× in Table 4 with selection pins AACBB. In Sample 5, the LM bundle is directed to the bundle extruded substrate of a mPE Blend/Tie/mPE Blend/Tie/EVOH/Tie/mPE blend with selection pin AACBB.

The ability to extrude portions of barrier extrusion layers using layer multiplication technology allows for significant improvement in barrier properties of oxygen transmission rates as well as water vapor transmission rates that are significantly better than comparable weight layers applied using traditional extrusion patterns.

Example 3 Improved WVTR Performance

A control and test condition were prepared using a pilot scale coextrusion line consisting of 3 extruders (2.5", 2" and 1.25" diameter) connected via a coextrusion feedblock to an adjustable slot die. The same resins were used in both samples. The test condition used a 4× LM on the entire matte layer using a AACBB pin selection for the nylon/tie/LDPE layers and a ACBCA pin selection for the Tie/EVOH/Tie/LDPE layers. The control condition had no LM used.

Both the control and test condition had the following structure (gloss to matte): 12 #LDPE/132 #board/6 #nylon/2 #Tie/12 #LDPE/1.5 #Tie/2 #EVOH/1.5 #Tie/6 #LDPE The resulting 28 layer structure applied to the board, beginning on the board surface is: nylon/nylon/Tie/LDPE/nylon/Tie/LDPE/nylon/Tie/LDPE/nylon/Tie/LDPE/LDPE/LDPE/Tie/EVOH/Tie/EVOH/Tie/Tie/EVOH/Tie/Tie/EVOH/Tie/LDPE Upon testing, the control condition was found to have a WVTR of 0.57 g/m²·day and the test condition using the 4× LM on the entire matte layer was found to have a WVTR of 0.38 g/m²·day, a 34% improvement. WVTR was tested at 37.8° C. and 50% RH.

Example 4. Improved WVTR Performance—Effect of mPE with Reduced Coat Weights

Control and test conditions were prepared using a pilot scale coextrusion line consisting of 3 extruders (2.5", 2" and 1.25" diameter) connected via a coextrusion feedblock to an adjustable slot die. Test condition 1 used a 4× LM for the nylon and a 2× LM for the EVOH. Test condition 2 used a 4× LM for the nylon and a 2× LM for the EVOH, 20% mPE on the matte layers 33% reduction in nylon coat weight and 16% reduction in mPE coat weights. The same resins were used in all samples with the exception of metallocene LLDPE (mPE) being substituted for LDPE in test condition 2. Test conditions used a ACBCA selection pin for the LM.

The control sample had the following structure (gloss to matte):
12 #LDPE/257 #board/6 #nylon/2 #Tie/12 #LDPE/1.5 #Tie/2 #EVOH/1.5 #Tie/6 #LDPE Sample 1 had the following structure (gloss to matte): 12 #LDPE/257 #board/3 #LDPE/1 #Tie/6 #nylon/1 #Tie/9 #LDPE/1.5 #Tie/2 #EVOH/1.5 #Tie/6 #LDPE Sample 2 had the following structure (gloss to matte): 12 #LDPE/257 #board/3 #mPE blend/1 #Tie/4 #nylon/1 #Tie/8 #mPE blend/1.5 #Tie/2 #EVOH/1.5 #Tie/5 #mPE blend.

The entire matte side barrier layers were bundled with LM to provide an extrusion pattern of multiplied layers which are extruded in a proportional weight ratio and the following structure of: mPE blend/Tie/nylon/Tie/Tie/nylon/Tie/Tie/nylon/TielTie/nylon/Tie/mPE blend/mPE blend/Tie/EVOH/Tie/Tie/EVOH/Tie/mPE blend.

Upon testing the control condition was found to have a WVTR of 1.50 g/m²·day, test condition 1 a WVTR of 0.91 g/m²·day (39% improvement), and test condition 2 a WVTR of 0.65 g/m² day (57% improvement). WVTR was tested at 37.8° C. and 50% RH. These data show that use of the LM has a significant effect on WVTR of extrusion coated paperboard. In addition, inclusion of mPE in the barrier structure further improves WVTR even with reduced coat weights of the polymers in the barriers.

Example 5. Improved WVTR Performance—Effect of mPE with Reduced Coat Weights

Control and test conditions were prepared using a pilot scale coextrusion line consisting of 3 extruders (2.5", 2" and 1.25" diameter) connected via a coextrusion feedblock to an adjustable slot die. Samples used the ACBCA selection pin for the LM. Test condition 1 used a 4× LM for the nylon, 20% mPE in the matte layers and a 33% reduction in nylon coat weight. Test condition 2 used a 4× LM for the nylon, 20% mPE in the matte layers, 33% reduction in nylon coat weight and 14% reduction in matte side LDPE. The same resins were used in all samples with the exception of metallocene LLDPE (mPE) being substituted for LDPE in test conditions 1 and 2.

The control sample had the following structure (gloss to matte): 12 #LDPE/257 #board/6 #nylon/2 #Tie/23.5 #LDPE Sample 1 had the following structure (gloss to matte): 12 #LDPE/257 #board/3 #mPE blend/1 #Tie/4 #nylon/1 #Tie/3 #mPE blend/17.5 #LPDE Sample 2 had the following structure (gloss to matte): 12 #LDPE/257 #board/3 #mPE blend/1 #Tie/4 #nylon/1 #Tie/3 #mPE blend/15 #LPDE The bundled layer of sample 1 and 2 utilizes the same structure but with different coat weights. Using a ACBCA pin selector the LM bundle was applied to the mPE blend/Tie/nylon/Tie mPE. A traditional extrusion layer of LPDE was then applied to the LM bundle. The 4× layer multiplication extrusion pattern of 14 multiplied layers were extruded in a proportional weight ratio and in a structure having a multiplied layer of: mPE blend/Tie/nylon/Tie/Tie/nylon/Tie/Tie/nylon/Tie/Tie/nylon/Tie/mPE blend.

Upon testing the sample condition was found to have a WVTR of 2.38 g/m²·day, sample 1 a WVTR of 1.88 g/m²·day (21% improvement), and sample 2 a WVTR of 1.42 g/m²·day (40% improvement). WVTR was tested at 37.8° C. and 50% RH. These data show that inclusion of mPE in the barrier structure with LM provides a significant improvement in WVTR even with reduced coat weights of the polymers in the barriers.

By comparison, the use of mPE alone, without the use of LM, does not have a significant effect on WVTR. Samples from a pilot scale coextrusion production of barrier board containing nylon, but not EVOH, did not show a significant effect of mPE on WVTR. The control sample had a WVTR of 3.30 g/m²·day while the control sample containing 20% mPE had a WVTR of 3.41 g/m²·day.

Evaluation of the Examples 1-5 and the corresponding samples described herein have revealed that some embodiments have improved structural integrity when either the nylon layer multiplied layer or an EVOH multiplied layer is not immediately adjacent to a layer of either LDPE or a mPE blend. Structural integrity is improved if there is at least one intervening layer between the nylon or EVOH and any subsequent layer of LDPE or mPE blend.

In accordance with this invention, it has been found that for embodiments using EVOH as a barrier layer, that the low weights of 2 # within the structure will sometimes result in a layer multiplied structure in which the EVOH multiplied layers are so thin that they may lose their integrity. Accordingly, embodiments that utilize layer multiplication technology on the nylon, LDPE, and LDPE/mPE blends are believed to be preferable structures when lower weights of EVOH are utilized. The inclusion of mPE as part of a blend with LDPE and when used with layer multiplication provides improvement to the barrier properties and the physical properties of the barrier board.

The ability to incorporate mPE as a blend offers an opportunity to lower the total amount of barrier materials on a weight basis without compromising the ability of a carton or other structure made from the barrier board. In evaluation of various structures in which the nylon content was reduced from 4 # in the matte layer and the LDPE component in the matte layer was consistently reduced by 4#, resulted in a lower weight barrier but which maintained better shelf life performance as evaluated from carton bulge data offered from comparable performance to control cartons.

According to this invention, it has also been found that the structures described herein can achieve excellent barrier performance using LM in which nylon 6 layer is blended with a 15% amorphous nylon, or replaced entirely with 100% amorphous nylon, or replaced entirely with 100% MXD nylon. For instance, in Example 1, Samples 2-4 can have the nylon 6 layer replaced with a blend of nylon 6 and 15% amorphous nylon 6 or be substituted with 100% amorphous nylon. or the nylon 6 can be substituted with 100% MXD nylon. As set forth in Table 5, the barrier properties for OTR and WVTR are set forth with respect to a control comparison.

TABLE 5

Barrier performance of LMT and different nylons

| Condition | OTR (cc/m² · day) | WVTR (g/m² · day) |
|---|---|---|
| Example 5 Control | 34 | 2.7 |
| 15% Am nylon with 85% nylon 6 | 18.5 | 3.18 |
| 100% Am nylon | 20.7 | 3.37 |
| 100% MXD nylon | 2.32 | 2.39 |

As seen in reference to Table 5, doing layer multiplication on a blend of 15% amorphous nylon with 85% nylon 6 brings about substantial improvements in the OTR and WVTR values. Similarly, using the structure of Example 5 control and substituting 100% amorphous nylon for the nylon 6 or within 100% MXD nylon also brings about the improvements as noted.

Accordingly, in any of the embodiments set forth herein, is believed that a substitution of the nylon 6 with a blend of 15% amorphous nylon with 85% nylon 6 can bring about useful improvements in barrier properties. Similarly, for any of the sample embodiments set forth herein, substituting the nylon 6 with up to about 100% amorphous nylon or with 100% MXD nylon can also bring about improvements when those barrier constituents are applied using layer multiplication.

One advantage of the layer multiplication is that the improvements to the barrier properties and board integrity lend themselves to utilizing lower coating weights of the various barrier layer components while still maintaining a commercially acceptable product. For instance, in the various examples and samples set forth wherein, the structures setting forth 6 # of nylon could have the amount of nylon reduced to 4#. Within the same structures, the amount of LDPE or a LDPE blend that is utilized can be reduced in some samples from 23.5 # to 19.5 # in other examples from 20 # to 16 # and in other examples from 26 # to 22#. The cost savings from the material reduction offers a significant advantage.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention or claims as set forth herein. In addition, it should be understood that aspects of the various embodiments may be interchanged, both in whole, or in part. Therefore, the spirit and scope of the invention and claims should not be limited to the description of the preferred versions contained therein.

That which is claimed:

1. A paperboard substrate for food packaging comprising:
   a paperboard having an outer surface and an inner surface, the outer surface defining a food contact surface;
   a multi-layer extrusion applied directly to the outer board surface and in the order of Nylon/Nylon/Tie/mPE Blend/Nylon/Tie/mPE Blend/Nylon/Tie/mPE Blend/Nylon/Tie/mPE Blend/mPE Blend;
   a tie layer applied to the blend layer;
   an EVOH layer applied to the tie layer;
   a tie layer applied to the EVOH layer; and
   a LDPE layer applied to the tie layer.

2. The paperboard substrate according to claim 1 wherein the nylon is a blend of nylon 6 and amorphous nylon.

3. The paperboard substrate according to claim 1 wherein the nylon is an amorphous nylon.

4. The paperboard substrate according to claim 1 wherein the nylon is a MXD nylon.

5. A paperboard substrate for food packaging comprising:
   a paperboard having an outer surface and an inner surface, the outer surface defining a food contact surface;
   a multi-layer extrusion applied directly to the board surface and having the structure of Nylon/Nylon/Tie/mPE Blend/Nylon/Tie/mPE Blend/Nylon/Tie/mPE Blend/Nylon/Tie/mPE Blend/mPE Blend; and
   additional extruded layers applied in order to the multi-layer extrusion of an LDPE layer/Tie layer/EVOH layer/Tie layer/LDPE.

6. The paperboard substrate according to claim 5 wherein the nylon is a blend of nylon 6 and amorphous nylon.

7. The paperboard substrate according to claim 5 wherein the nylon is an amorphous nylon.

8. The paperboard substrate according to claim 5 wherein the nylon is a MXD nylon.

9. A paperboard substrate for food packaging comprising:
   a paperboard having an outer surface and an inner surface, the outer surface defining a food contact surface;
   a multi-layer extrusion applied directly to the board surface and having the structure of: Nylon/Nylon/Tie/mPE Blend/Nylon/Tie/mPE Blend/Nylon/Tie/mPE Blend/Nylon/Tie/mPE Blend/mPE Blend; and
   an additional extruded layer of LDPE applied to the multilayer extrusion.

10. The paperboard substrate according to claim 9 wherein the nylon is a blend of nylon 6 and amorphous nylon.

11. The paperboard substrate according to claim 9 wherein the nylon is an amorphous nylon.

12. The paperboard substrate according to claim 9 wherein the nylon is a MXD nylon.

* * * * *